(12) United States Patent
Xu et al.

(10) Patent No.: US 9,285,038 B2
(45) Date of Patent: Mar. 15, 2016

(54) FLOW CONTROL VALVE

(75) Inventors: Guohua Xu, Zhejiang Province (CN); Ming Lv, Zhejiang Province (CN); Qingyong Wang, Zhejiang Province (CN)

(73) Assignee: Zhejiang Sanhua Co., Ltd., Zhejiang (CN)

(*) Notice: Subject to any disclaimer, the term of this patent is extended or adjusted under 35 U.S.C. 154(b) by 188 days.

(21) Appl. No.: 14/124,237

(22) PCT Filed: Jun. 26, 2012

(86) PCT No.: PCT/CN2012/077519
§ 371 (c)(1),
(2), (4) Date: Dec. 5, 2013

(87) PCT Pub. No.: WO2013/000394
PCT Pub. Date: Jan. 3, 2013

(65) Prior Publication Data
US 2014/0103235 A1 Apr. 17, 2014

(30) Foreign Application Priority Data
Jun. 27, 2011 (CN) .......................... 2011 1 0175952

(51) Int. Cl.
*F16K 47/08* (2006.01)
*F16K 31/50* (2006.01)
(Continued)

(52) U.S. Cl.
CPC ................ *F16K 5/0605* (2013.01); *F16K 3/246* (2013.01); *F16K 3/34* (2013.01); *F16K 5/10* (2013.01); *F25B 41/062* (2013.01); *F25B 2341/0653* (2013.01); *Y02B 30/72* (2013.01)

(58) Field of Classification Search
CPC ........... F16K 1/54; F16K 3/246; F16K 3/314; F16K 3/34; F16K 5/10
USPC ................... 137/625.3, 625.33; 251/120, 121
See application file for complete search history.

(56) References Cited

U.S. PATENT DOCUMENTS 952,187 A * 3/1910 Donnelly ....................... 251/120
1,193,849 A * 8/1916 Viger ............................. 251/333
(Continued)

FOREIGN PATENT DOCUMENTS

| CN | 85103856 A | 5/1987 |
| CN | 2703169 Y | 6/2005 |

(Continued)

OTHER PUBLICATIONS

International Search Report dated Oct. 4, 2012 from corresponding International Application PCT/CN2012/077519.
(Continued)

*Primary Examiner* — Marina Tietjen
*Assistant Examiner* — Seth W Mackay-Smith
(74) *Attorney, Agent, or Firm* — James H. Morris

(57) ABSTRACT

A flow control valve comprises a valve seat (1) having a valve port (121) in its valve chamber and a valve rod (2) opening or closing the valve port (121). A sleeve protrusion part (122) projects upward from the valve port (121) in an axial direction thereof. The valve rod (2) is tubular and is cylindrical at the lower end. An open slot (3) matching with a flow curve is provided in the circumferential side wall of one of the sleeve protrusion part (122) and the lower end of the valve rod (2). One of the sleeve protrusion part (122) and the lower end of valve rod (2) is inserted into or extracted from the other to disconnect or connect the open slot (3) with the valve port (121). The structural design of the flow control valve can balance the refrigerant pressure on the valve rod (2) in the axial direction while ensuring that the required flow curve can be obtained.

20 Claims, 17 Drawing Sheets

(51) Int. Cl.
  *F16K 5/06* (2006.01)
  *F16K 3/24* (2006.01)
  *F16K 3/34* (2006.01)
  *F16K 5/10* (2006.01)
  *F25B 41/06* (2006.01)

(56) References Cited

U.S. PATENT DOCUMENTS

| | | | |
|---|---|---|---|
| 1,384,432 A * | 7/1921 | Dempler | 251/86 |
| 1,777,261 A * | 9/1930 | Grainger et al. | 251/210 |
| 1,970,726 A * | 8/1934 | Barrett | 251/122 |
| 2,336,653 A * | 12/1943 | Taylor | 137/625.3 |
| 2,541,176 A * | 2/1951 | Rockwell | 137/625.3 |
| 2,688,462 A * | 9/1954 | Barbehenn | 251/225 |
| 3,001,551 A * | 9/1961 | Wyser | 137/635 |
| 3,349,798 A * | 10/1967 | Allen | 137/625.17 |
| 3,533,598 A | 10/1970 | Tillman | |
| 3,724,813 A * | 4/1973 | Baumann | 251/360 |
| 4,304,136 A * | 12/1981 | McCabe et al. | 73/861.54 |
| 4,436,279 A | 3/1984 | Bonds et al. | |
| 4,892,118 A | 1/1990 | Davis et al. | |
| 4,932,434 A * | 6/1990 | Taylor | 137/469 |
| 5,318,064 A | 6/1994 | Reinicke | |
| 5,735,501 A | 4/1998 | Maurer et al. | |
| 6,293,514 B1 * | 9/2001 | Pechoux et al. | 251/122 |
| 6,568,656 B1 | 5/2003 | Wrocklage | |
| 7,011,081 B2 * | 3/2006 | Hrytzak et al. | 123/568.17 |
| 2011/0084224 A1 | 4/2011 | Zhan et al. | |

FOREIGN PATENT DOCUMENTS

| | | |
|---|---|---|
| CN | 2735101 Y | 10/2005 |
| CN | 2775430 Y | 4/2006 |
| CN | 2823701 Y | 10/2006 |
| CN | 1985118 A | 6/2007 |
| CN | 200580023202.7 | 6/2007 |
| CN | 201013922 Y | 1/2008 |
| CN | 201265694 Y | 7/2009 |
| CN | 101749467 A | 6/2010 |
| CN | 101858455 A | 10/2010 |
| CN | 101960187 A | 1/2011 |
| CN | 201706059 U | 1/2011 |
| CN | 102032380 A | 4/2011 |
| CN | 202109047 U | 1/2012 |
| CN | 202149257 U | 2/2012 |
| DE | 7324776 U | 9/1974 |
| JP | 48-66246 U | 8/1973 |
| JP | 49-5730 U | 1/1974 |
| JP | 54161039 U | 11/1979 |
| JP | 60-121564 U | 8/1985 |
| JP | H 06123366 A | 5/1994 |
| JP | 06-51646 U | 7/1994 |
| JP | 8004931 A | 1/1996 |
| JP | 8-303638 A | 11/1996 |
| JP | H 10131604 A | 5/1998 |
| JP | 2002310541 A | 10/2002 |
| JP | 2008267151 A | 11/2008 |
| JP | 2009287769 A | 12/2009 |
| KR | 20080098725 A | 11/2008 |
| KR | 100944762 B | 3/2010 |
| KR | 946722 B1 | 4/2010 |
| SU | 1555583 A1 | 4/1990 |

OTHER PUBLICATIONS

International Search Report dated Oct. 4, 2012 from potentially related International Application No. PCT/CN2012/077522.

International Search Report dated Oct. 4, 2012 from potentially related International Application No. PCT/CN2012/077516.

International Search Report dated Sep. 27, 2012 from potentially related International Application No. PCT/CN2012/077508.

Extended European Search Report dated Jan. 16, 2015 and European Search Opinion dated Jan. 26, 2015 from corresponding European Application 12803865.

South Korean Office Action fdated Mar. 25, 2015 rom corresponding Korean Application 10-2014-7000664.

* cited by examiner

FLOW CONTROL VALVE

This application is the national phase of International Application No. PCT/CN2012/077519, titled "FLOW CONTROL VALVE" and filed on Jun. 26, 2012, which claims the benefit of priority to Chinese Patent Application No. 201110175952.3 entitled "FLOW ADJUSTING VALVE" and filed with the Chinese State Intellectual Property Office on Jun. 27, 2011, the entire disclosures of which are incorporated herein by reference.

FIELD OF THE INVENTION

The present application relates to the technical field of the fluid control component, and particularly to a flow adjusting valve.

BACKGROUND OF THE INVENTION

The flow adjusting valve is an important component of the refrigeration system, and is another one of four fundamental components of the refrigeration system besides the evaporator, the compressor and the condenser. Operation process of the flow adjusting valve is generally as follows: with the energizing or de-energizing of the coil device, the valve needle is driven to adjust the opening degree of the valve port, so as to adjust the flow of the refrigerant.

In general, a different flow curve should be set for the flow adjusting valve according to different application environment. Referring to FIG. 1, FIG. 1 is a flow curve schematic diagram of a flow adjusting valve in the prior art.

As is shown in FIG. 1, the longitudinal coordinates V represents the flow of the refrigerant flowing through the valve port of the flow adjusting valve, and the horizontal coordinates S represents the distance between the valve rod of the flow adjusting valve and the valve port. As is shown in FIG. 1, as the valve rod is gradually moved away from the valve port, the flow of the refrigerant is gradually increased, forming a flow curve having a certain curvature.

In the prior art, in order to form the flow curve as shown in FIG. 1, U.S. Pat. No. 6,568,656B1 discloses a flow adjusting valve. Referring to FIG. 2 and FIG. 3, FIG. 2 is a structural schematic view of a flow adjusting valve in the prior art; and FIG. 3 is a pressure distribution schematic view of the refrigerant at the valve port of the flow adjusting valve shown in FIG. 2.

As is shown in FIG. 2, the flow adjusting valve in the prior art includes a valve seat 1' and a valve rod 2'. The valve seat 1' is provided, in the valve cavity thereof, with a valve port 1'1, and the valve rod 2' is moved up and down along the axial direction, thereby adjusting the flow of the valve port 1'1. As is shown in FIG. 2, the valve rod 2' has a split structure and includes a conical tube segment 2'1, a cylindrical tube segment 2'2, and a sealing member 2'3 provided between the conical tube segment and the cylindrical tube segment. As the valve rod 2' is moved up and down, the valve port 1'1 is opened or closed by the sealing member 2'3. Furthermore, the valve rod 2' is provided with a balancing flow passage 2'4 for communicating an upper end and a lower end of the valve rod 2', thereby balancing the effect of the pressure exerted by the refrigerant on the valve rod 2'.

As is shown in FIG. 2, since the lower end portion of the valve rod 2' is provided with a conical tube segment 2'1, as the conical tube segment 2'1 is away from the valve port 1'1, the flow curve shown in FIG. 1 can be formed. Meanwhile, the curvature of the flow curve may be adjusted by changing the conical degree of the conical tube segment 2'1. However, the flow adjusting valve has disadvantages as follows.

Firstly, as is shown in FIG. 3, since the lower end portion of the valve rod 2' is provided with a conical tube segment 2'1, pressures from the refrigerant at the valve port 1'1 are substantially divided into three grades, that is, pressure grade A which has the maximum pressure (at the densest position of the transverse schematic line), pressure grade B which has the moderate pressure (at the denser position of the transverse schematic line), and pressure grade C which has the minimum pressure (at the sparsest position of the transverse schematic line). Therefore different positions of the conical tube segment 2'1 are subject to the above three different pressures, respectively. As shown in FIG. 3, the lower end opening of the balancing flow passage 2'4 is extended in the area of the pressure grade A, thus the upper end of the valve rod 2' suffers a pressure of pressure grade A. It can be seen that, under the precondition that the force bearing areas of the upper end and lower end of the valve rod 2' are the same, the force suffered by the upper end of the valve rod 2' is different from the force suffered by the lower end (i.e., the conical tube segment 2'1) of the valve rod 2'. That is, pressures exerted by the refrigerant on the valve rod 2' are uneven. Therefore the stability of the axial movement of the valve rod 2' is affected.

Secondly, as is shown in FIG. 2, during the closing of the valve port 1'1 by the sealing member 2'3, the sealing member 2'3 may collide with the valve port 1'1. Since the impact force is large, after performing the opening and closing operations time and again, the sealing member 2'3 is easy to be deformed, resulting in the leakage of the refrigerant and a short service life of the sealing member.

Thirdly, as is shown in FIG. 2, the valve rod 2' has a split structure and includes a conical tube segment 2'1, a sealing member 2'3, and a cylindrical tube segment 2'2, and the three components are connected in a threaded manner or in other connection manners. The valve rod 2' has a risk of being loosen and disconnected due to the bump and vibration in transportation or the vibration of the compressor in operation.

In addition, it should be noted that, in the prior art, a flow adjusting valve disclosed in Chinese Patent Application No. 200580023202.7 also has the above three disadvantages, reference may be made to the specification of the application, which will not be described in detail herein.

In view of this, it becomes an urgent problem to be solved by the person skilled in the art to improve the flow adjusting valve in the prior art, such that, on the one hand, different flow curves that are required can be obtained based on the different application environments, and on the other hand, pressures exerted by the refrigerant on the valve rod along the axial direction thereof can be balanced.

SUMMARY OF THE INVENTION

The technical problem to be solved by the present application is to provide a flow adjusting valve. With the structural arrangement of the flow adjusting valve, pressures exerted by the refrigerant on the valve rod along the axial direction thereof can be balanced while ensuring that different flow curves that are required can be obtained.

In order to solve the above technical problem, the present application provides a flow adjusting valve including a valve seat and a valve rod. The valve seat is provided, in a valve cavity thereof, with a valve port, and the valve port is opened or closed by the valve rod. The valve port is provided with a sleeve protrusion portion projected upwards along an axial direction of the valve port, and the valve rod has a tubular shape. A circumferential side wall of one of the sleeve protrusion portion and a lower end portion of the valve rod is provided with an opening groove corresponding to a flow curve, and one of the sleeve protrusion portion and the lower end portion of the valve rod is projected into the other one or is moved out of the other one, to stop the communication between the opening groove and the valve port or to communicate the opening groove with the valve port.

Preferably, the opening groove is provided on the circumferential side wall of the sleeve protrusion portion. The sleeve protrusion portion is provided with a first sealing stepped surface at a position lower than the lowest end of the opening groove. A lower end face of the valve rod is hermetically contacted with the first sealing stepped surface or is disengaged from the first sealing stepped surface.

Preferably, the first sealing stepped surface is provided inside of the sleeve protrusion portion; and the lower end portion of the valve rod is projected into the sleeve protrusion portion or is moved out of the sleeve protrusion portion.

Preferably, the opening groove is provided on the circumferential side wall of the lower end portion of the valve rod; and the lower end portion of the valve rod is provided with a second sealing stepped surface at a position higher than the uppermost end of the opening groove, and an upper end face of the sleeve protrusion portion is hermetically contacted with the second sealing stepped surface or is disengaged from the second sealing stepped surface.

Preferably, the second sealing stepped surface is provided within the lower end portion of the valve rod; and the sleeve protrusion portion is projected into the lower end portion of the valve rod or is moved out of the lower end portion of the valve rod.

Preferably, an injection molded body for installing a nut is provided inside of the valve rod, a lower end face of the injection molded body is higher than the uppermost end of the opening groove, and the lower end face of the injection molded body is formed with the second sealing stepped surface.

Preferably, the lower end portion of the valve rod is integrally formed with a circumferential expanded portion having an increased external diameter, and the second sealing stepped surface is provided inside of the circumferential expanded portion.

Preferably, the second sealing stepped surfaces is provided outside of the lower end portion of the valve rod, and the lower end portion of the valve rod is projected into or is moved out of the sleeve protrusion portion.

Preferably, the opening groove is a V-shaped groove, and the larger opening end of the V-shaped groove is faced towards the sleeve protrusion portion or the lower end portion of the valve rod.

Preferably, the opening groove is a Y-shaped groove, and the larger opening end of the Y-shaped groove is faced towards the sleeve protrusion portion or the lower end portion of the valve rod.

Preferably, the valve seat has a split structure including an upper valve seat and a lower valve seat. The valve port and the sleeve protrusion portion are provided on the lower valve seat, and the sleeve protrusion portion is projected into a cavity of the upper valve seat.

Preferably, the flow adjusting valve further includes a first connecting pipe and a second connecting pipe, the first connecting pipe is connected to the upper valve seat, and the second connecting pipe is connected to the lower valve seat.

Preferably, the lower valve seat includes a base, the sleeve protrusion portion is provided on an upper end of the base, and a lower end face of the base is closed; and a circumferential side wall of the base is provided with a connecting orifice, and the second connecting pipe is connected to the connecting orifice.

Preferably, the lower valve seat includes a base, and the sleeve protrusion portion is provided on an upper end of the base; and the base is in a sleeve shape, a lower end face of the base is provided with a connecting orifice, and the second connecting pipe is connected to the connecting orifice.

On basis of the prior art, the valve port of the flow adjusting valve according to the present application is provided with a sleeve protrusion portion projected upwards along an axial direction of the valve port. The valve rod has a tubular shape, and the lower end portion of the valve rod is a cylinder. A circumferential side wall of one of the sleeve protrusion portion and the lower end portion of the valve rod is provided with an opening groove corresponding to a flow curve, and one of the sleeve protrusion portion and the lower end portion of the valve rod is projected into the other one or is moved out of the other one, to stop the communication between the opening groove and the valve port or to communicate the opening groove with the valve port.

The shape of the opening groove is corresponded to the required flow curve, for example, the opening groove may have a V-shape, a Y-shape or other shapes. An opening groove having a shape corresponded to that of the flow curve required by a refrigeration system may be provided on the circumferential side wall of the sleeve protrusion portion or the side wall of the lower end portion of the valve rod. In operation, as the valve rod is disengaged from the sleeve protrusion portion, the opening groove is initially in communication with the valve port in a way allowing a small flow passing through, and as the valve rod is further moved from the sleeve protrusion portion, the circulation area of the opening groove is gradually increased, and the flow of the refrigerant is gradually increased. When the opening groove is fully opened, the maximum flow between the opening groove and the valve port is achieved. Thus it can be seen that, the flow adjusting valve according to the present application can obtain the required flow curve.

In addition, since the lower end portion of the valve rod is a cylinder, but not a cone, pressures exerted by the refrigerant on the lower end of the valve rod are uniform. Meanwhile, since the valve rod has a tubular shape and is run through along the axial direction, the pressure exerted by the refrigerant on the upper end of the valve rod is equal to that exerted on the lower end thereof. Under the precondition that the force bearing areas of the upper and lower ends of the valve rod are equal, pressures exerted by the refrigerant on the valve rod along the axial direction thereof are balanced.

In conclusion, the flow adjusting valve according to the present application can balance pressures exerted by the refrigerant on the valve rod along the axial direction of the valve rod while ensuring that different flow curves that are required can be achieved.

BRIEF DESCRIPTION OF THE DRAWINGS

FIG. 5-1 is a schematic view showing an assembly relationship among a valve seat, a sleeve and a connecting pipe of the flow adjusting valve in FIG. 4;

FIG. 5-2 is an exploded schematic view of various components in FIG. 5-1;

FIG. 5-3 is a schematic view showing an assembly relationship among a valve seat, a sleeve and a connecting pipe improved on those in FIG. 5-1;

FIG. 5-4 is a schematic view showing an assembly relationship among a valve seat, a sleeve and a connecting pipe improved on those in FIG. 5-1 in another way;

FIG. 6-1 is a schematic view showing an assembly relationship among a valve seat, a sleeve and a connecting pipe according to another embodiment;

FIG. 6-2 is an exploded schematic view of various components in FIG. 6-1;

FIG. 7-1 is a structural schematic view of the lower valve seat in FIG. 5-1;

FIG. 7-2 is a sectional view of the lower valve seat in FIG. 7-1;

FIG. 8-1 is an assembly schematic view of a valve rod and the lower valve seat shown in FIG. 7-1 and FIG. 7-2;

FIG. 8-2 is a structural schematic view of a lower valve seat and a valve rod improved on those of FIG. 8-1;

FIG. 8-3 is a flow curve schematic view formed by a cooperation structure of the lower valve seat and the valve rod shown in FIG. 8-1;

FIG. 8-4 is a flow curve schematic view formed by a cooperation structure of the lower valve seat and the valve rod shown in FIG. 8-2;

FIG. 9-1 is a structural schematic view of a valve rod of a flow adjusting valve according to another embodiment of the present application;

FIG. 9-2 is a sectional view of the valve rod in FIG. 9-1;

FIG. 9-3 is a structural schematic view of a lower valve seat cooperated with the valve rod in FIG. 9-1;

FIG. 10-1 is a structural schematic view of a valve rod improved on that in FIG. 9-1;

FIG. 10-2 is a sectional view of the valve rod in FIG. 10-1;

Figure 1:
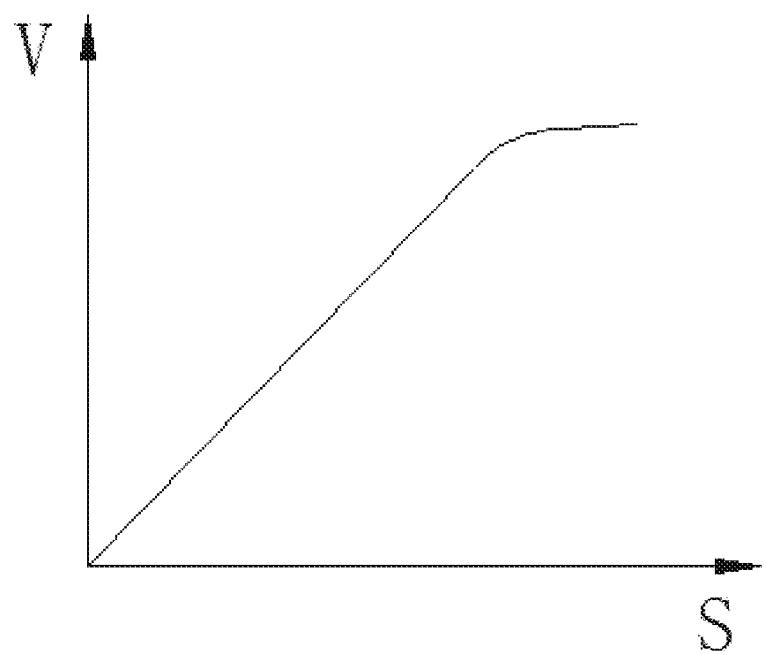
FIG. 1 is a flow curve schematic diagram of a flow adjusting valve in the prior art.
Figure 2:
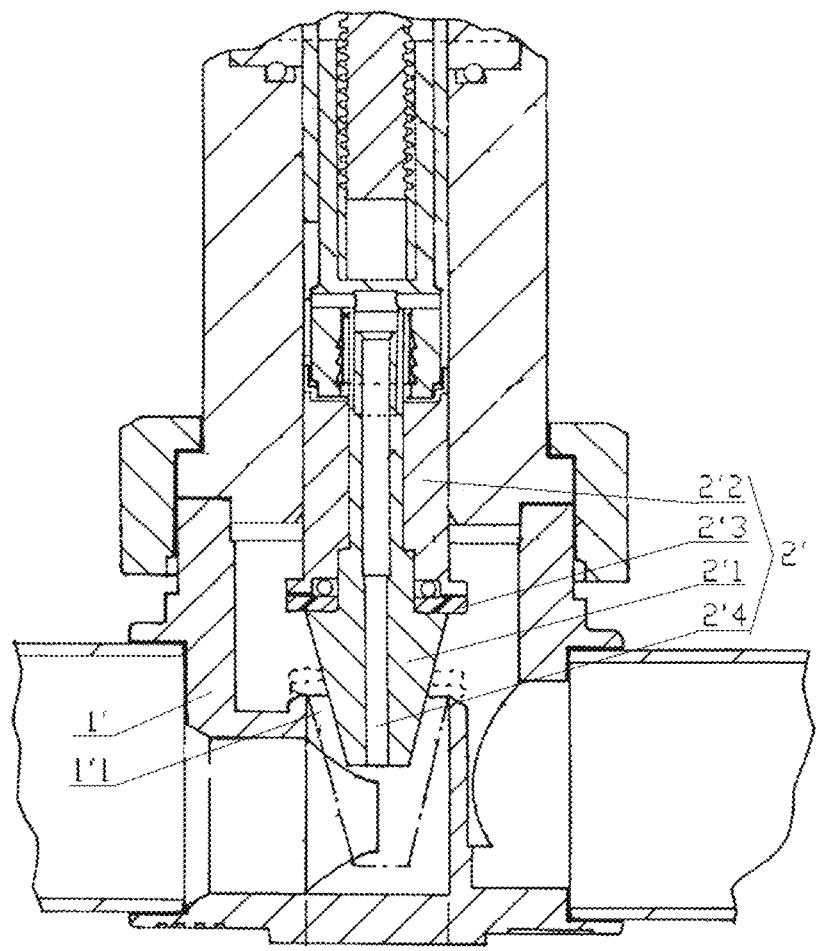
FIG. 2 is a structural schematic view of a flow adjusting valve in the prior art.
Figure 3:
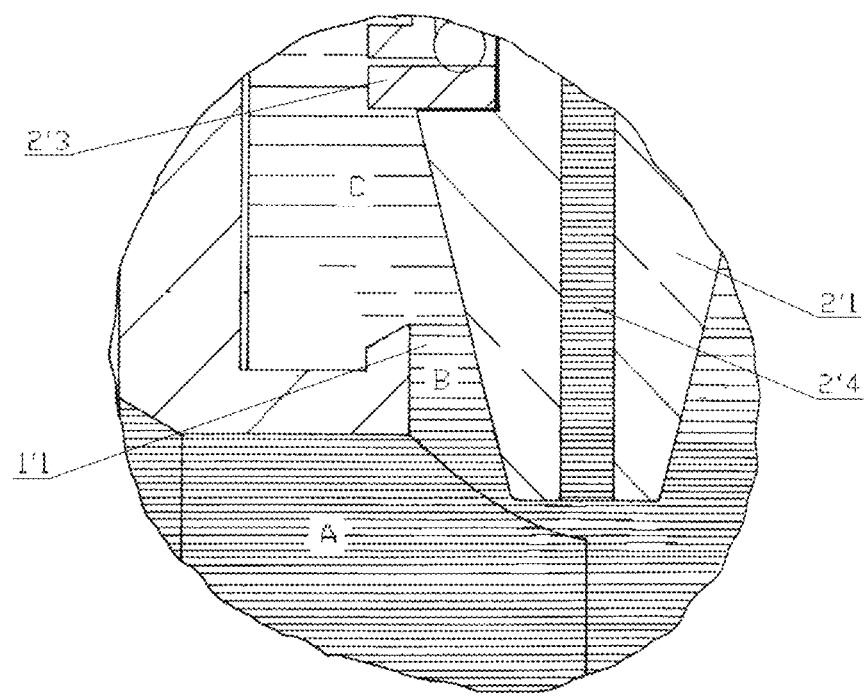
FIG. 3 is a pressure distribution schematic view of the refrigerant at the valve port of the flow adjusting valve shown in FIG. 2.

Corresponding relationships between reference numerals and components in FIGS. 1 to 3:

| | |
|---|---|
| 1' valve seat; | 1'1 valve port; |
| 2' valve rod; | 2'1 conical tube segment; |
| 2'2 cylindrical tube segment; | 2'3 sealing sheet; and |
| 2'4 balancing flow passage. | |

Corresponding relationships between reference numerals and components in FIGS. 4 to 11:

| | |
|---|---|
| 1 valve seat; | 11 upper valve seat; |
| 12 lower valve seat; | 121 valve port; |
| 122 sleeve protrusion portion; | 123 first sealing stepped surface; |
| 124 base; | |
| 2 valve rod; | 21 second sealing stepped surface; |
| 22 injection molded body; | 23 circumferential expanded portion; |
| 3 opening groove; | 41 first connecting pipe; |
| 42 second connecting pipe; | 43 connecting orifice; |
| 5 motor; | 51 output shaft; |
| 52 motor shell; | |
| 61 screw rod; | 62 gear seat; and |
| 63 sleeve. | |

DETAILED DESCRIPTION OF THE INVENTION

A spirit of the present application is to provide a flow adjusting valve, with the structural design of the flow adjusting valve, pressures exerted by the refrigerant on the valve rod in the axial direction can be balanced while ensuring that the required flow curve can be obtained.

In order that those skilled in the art can better understand technical solutions of the present application, the present application is described in detail hereinafter in conjunction with the accompanying drawings and the embodiments.

Figure 4:
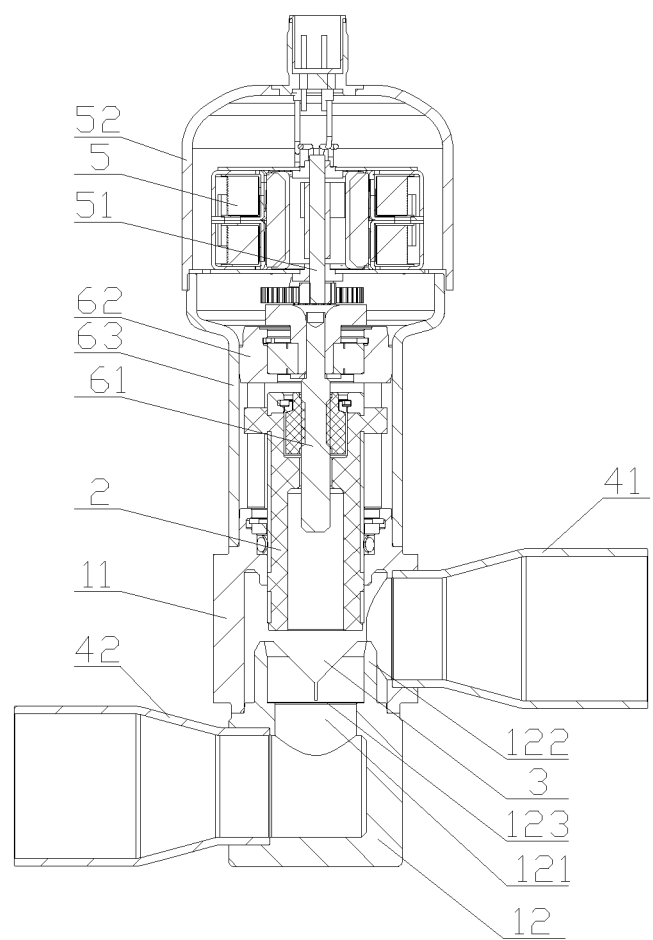
FIG. 4 is a structural schematic view of a flow adjusting valve according to an embodiment in the present application.

Referring to FIG. 4, FIG. 4 is a structural schematic view of a flow adjusting valve according to an embodiment of the present application.

The electronic expansion valve according to the present application is configured for adjusting the flow of the refrigerant. As shown in FIG. 4, the electronic expansion valve includes a motor shell 52 in which a motor 5 is provided. The output shaft 51 of the motor 5 is in transmission connection with the screw rod 61 via a gear system, therefore the screw rod 61 is rotated with the output shaft 51. As is shown in FIG. 4, the gear system is supported on the gear seat 62, a sleeve 63 is provided outside of the gear seat, and the screw rod 611 is passed through the gear seat 62 and is connected to the valve rod 2. With the rotation of the screw rod 61, the valve rod 2 is moved up and down axially, thereby achieving the adjusting of the flow of the refrigerant.

As is shown in FIG. 4, the valve seat 1 is provided, in the valve cavity thereof, with a valve port 121 which is closed or opened by the valve rod 2. Based on this arrangement, as is shown in FIG. 4, the valve port 121 is provided with a sleeve protrusion portion 122 protruded upwards along the axial direction of the valve port, the valve rod 2 has a tubular shape, and the lower end portion of the valve rod is a cylinder. A circumferential side wall of one of the sleeve protrusion portion 122 and the lower end portion of the valve rod 2 is provided with an opening groove 3 corresponding to a flow curve. And one of the sleeve protrusion portion 122 and the lower end portion of valve rod 2 is projected into the interior of the other one or is moved out of the other one (that is, the sleeve protrusion portion 122 is projected into the interior of the lower end portion of valve rod 2 or is moved out of the lower end portion of the valve rod, or the lower end portion of valve rod 2 is projected into the interior of the sleeve protrusion portion 122 or is moved out of the sleeve protrusion portion), to stop the communication between the opening groove 3 and the valve port 121 or to communicate the opening groove 3 with the valve port 121.

The shape of the opening groove 3 is corresponded to the required flow curve, for example, the opening groove 3 may have a V-shape, a Y-shape or other shapes. An opening groove 3 having a shape corresponded to that of the flow curve required by a refrigeration system may be provided on the circumferential side wall of the sleeve protrusion portion 122 or the side wall of the lower end portion of the valve rod 2. In operation, as the valve rod 2 is disengaged from the sleeve protrusion portion 122, the opening groove 3 is initially in communication with the valve port 121 in a way allowing a small flow passing through, and as the valve rod 2 is further moved from the sleeve protrusion portion 122, the circulation area of the opening groove 3 is gradually increased, and the flow of the refrigerant is gradually increased. When the opening groove 3 is fully opened, the maximum flow between the opening groove and the valve port 121 is achieved. Thus it can be seen that, the flow adjusting valve according to the present application can obtain the required flow curve.

In addition, since the lower end portion of the valve rod 2 is a cylinder, but not a cone, pressures exerted by the refrigerant on the lower end of the valve rod 2 are uniform. Meanwhile, since the valve rod 2 has a tubular shape and is run through along the axial direction, the pressure exerted by the refrigerant on the upper end of the valve rod 2 is equal to that exerted on the lower end thereof. Under the precondition that the force bearing areas of the upper and lower ends of the valve rod 2 are equal, pressures exerted by the refrigerant on the valve rod 2 along the axial direction thereof are balanced.

It should be noted that, in the above embodiments, the opening groove 3 may be provided on the side wall of the sleeve protrusion portion 122 or on the lower end portion of the valve rod 2. In the two technical solutions, the communication between the opening groove 3 and the valve port 121 can be stopped or the opening groove 3 can be communicated with the valve port 121 in any of the following manners: one is that the sleeve protrusion portion 122 is projected into the interior of the lower end portion of valve rod 2 or is moved out of the lower end portion of valve rod; the other is that the lower end portion of the valve rod 2 is projected into the interior of the sleeve protrusion portion 122 or is moved out of the sleeve protrusion portion.

Figures 1, 5:
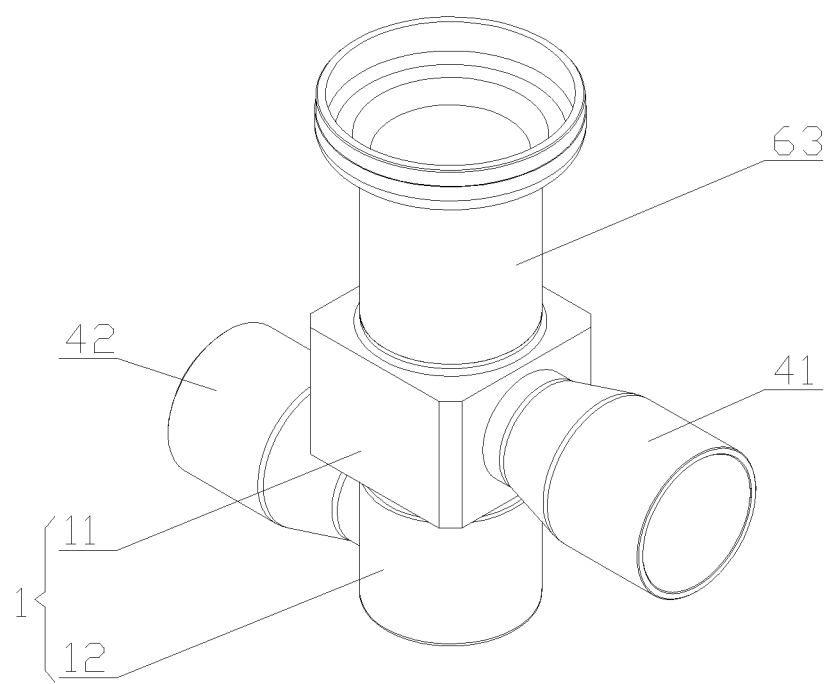
Figures 2, 5:
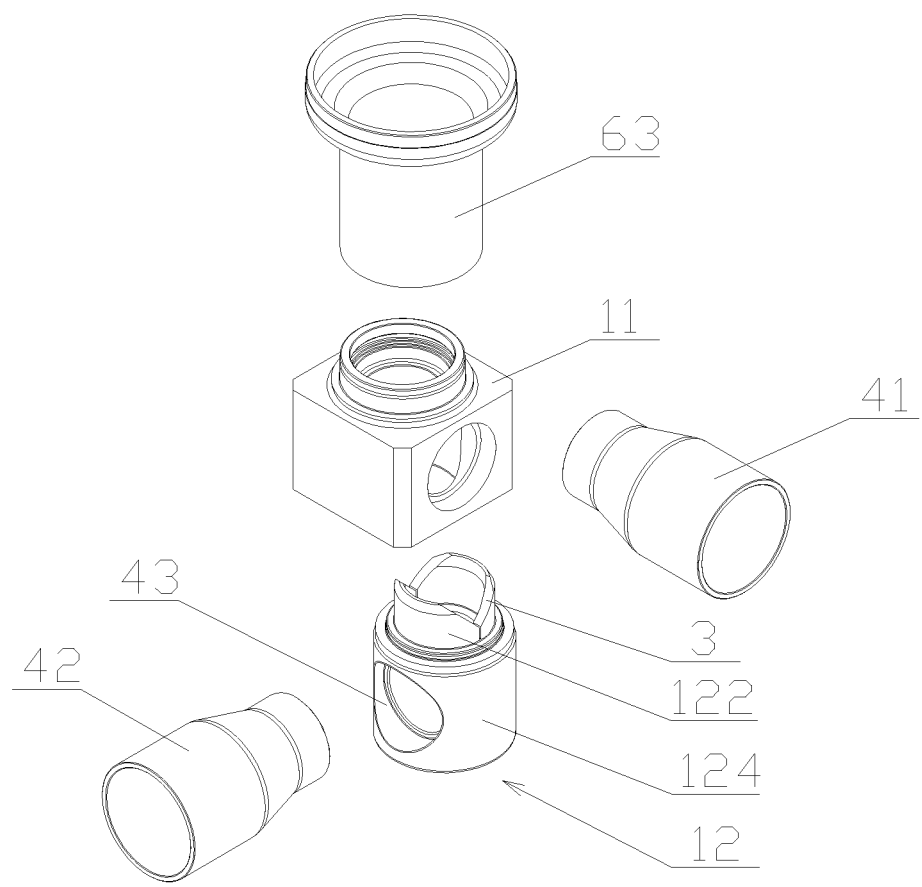
Figures 3, 5:
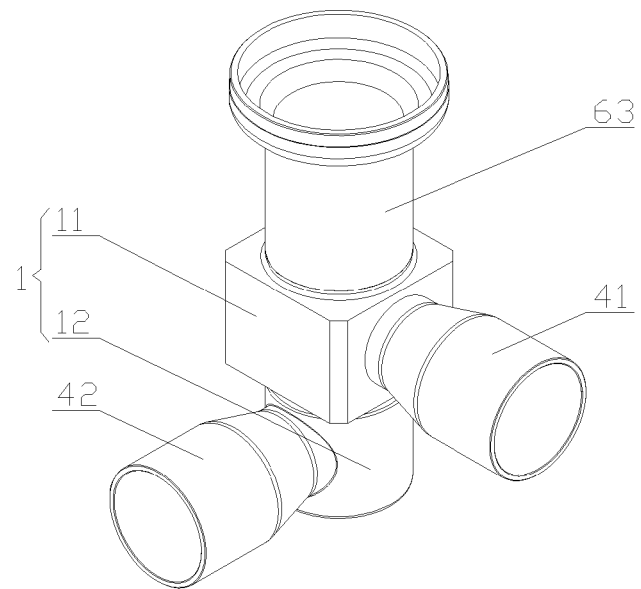
Figures 4, 5:
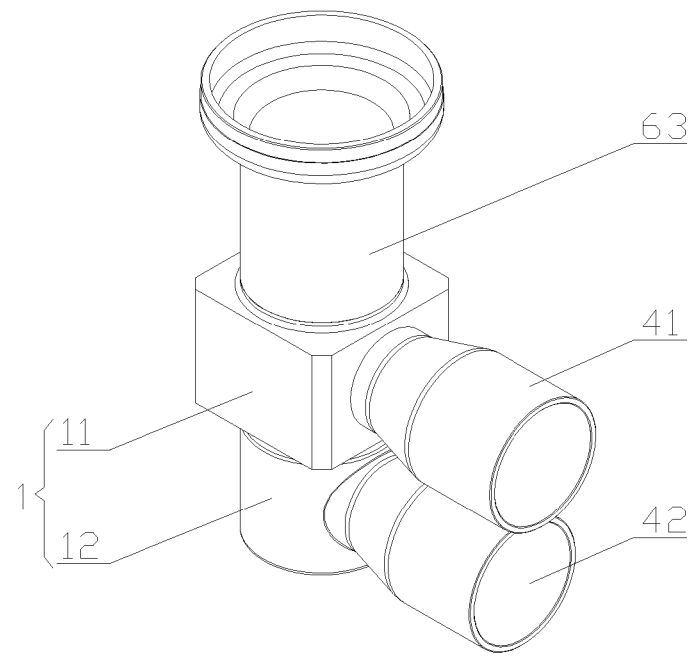

Referring to FIG. 5-1 to FIG. 5-4, FIG. 5-1 is a schematic view showing an assembly relationship among a valve seat, a sleeve and a connecting pipe of the flow adjusting valve in FIG. 4; FIG. 5-2 is an exploded schematic view of various components in FIG. 5-1; FIG. 5-3 is a schematic view showing an assembly relationship among a valve seat, a sleeve and a connecting pipe improved on those in FIG. 5-1; and FIG. 5-4 is a schematic view showing an assembly relationship among a valve seat, a sleeve and a connecting pipe improved on those in FIG. 5-1 in another way.

Further improvements may be made to the above technical solutions. For example, as is shown in FIG. 5-1 and FIG. 5-2, the valve seat 1 has a split structure which includes an upper valve seat 11 and a lower valve seat 12. The valve port 121 and the sleeve protrusion portion 122 are provided on the lower valve seat 12, and the sleeve protrusion portion 122 is projected into the cavity of the upper valve seat 11. In machining, the valve port 121 and the sleeve protrusion portion 122 are firstly machined on the lower valve seat 12, then the upper valve seat 11 is machined, and finally the machined lower valve seat 12 and upper valve seat 11 are assembled. It can be seen that, since the valve seat 1 has a split structure, the machining of the sleeve protrusion portion 122 can be easily realized. Therefore the machining process is simplified.

In addition, as is shown in FIG. 5-1 to FIG. 5-2, the flow adjusting valve further includes a first connecting pipe 41 and a second connecting pipe 42. The first connecting pipe 41 is connected to the upper valve seat 11, and the second connecting pipe 42 is connected to the lower valve seat 12. As is shown in FIG. 5-1, the first connecting pipe 41 and the second connecting pipe 42 are provided in parallel and are located at two sides of the valve seat 1, respectively. As is shown in FIG. 5-2, the first connecting pipe 41 and the second connecting pipe 42 are provided in parallel and are located at the same side of the valve seat 1. As is shown in FIG. 5-3, the first connecting pipe 41 and the second connecting pipe 42 are provided at different planes and are arranged substantially at an angle of 90 degree. Apparently, it is not limited to the 90 degree angle. It can be seen that, with the above structure arrangement, the positions of the first connecting pipe 41 and the second connecting pipe 42 can be arranged based on different application environments of the refrigeration system. Therefore, the present application has a good adaptability.

As shown in FIG. 5-2, the lower valve seat 12 includes a base 124. The sleeve protrusion portion 122 is provided on the upper end of the base 124, and the lower end face of the base 124 is closed. The circumferential side wall of the base 124 is provided with a connecting orifice 43, and the second connecting pipe 42 may be connected to the connecting orifice 43. The connecting orifice 43 may be provided on any positions of the circumferential side wall of the base 124 as required so as to achieve the structural arrangements of FIG. 5-2, FIG. 5-3 and FIG. 5-4.

Figures 1, 6:
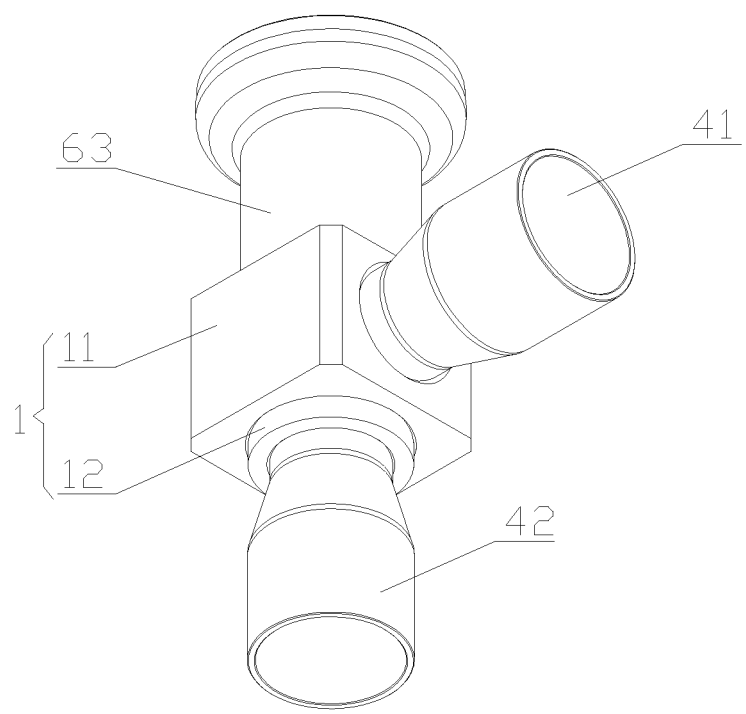
Figures 2, 6:
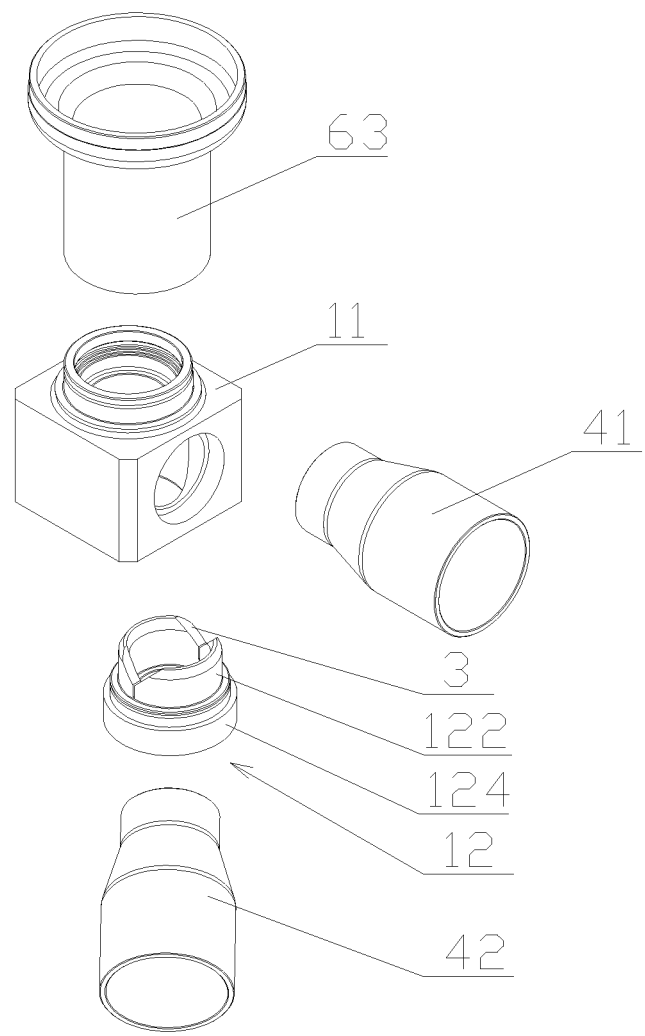

Referring to FIG. 6-1 and FIG. 6-2, FIG. 6-1 is a schematic view showing an assembly relationship among a valve seat, a sleeve and a connecting pipe according to another embodiment; and FIG. 6-2 is an exploded schematic view of various components in FIG. 6-1.

On basis of the above technical solutions, the lower valve seat 12 may be configured to have another structure. For example, as is shown in FIG. 6-2, the base 124 of the lower valve seat 12 is in a sleeve shape, and the lower end face of the base is provided with a connecting orifice 43. The second connecting pipe 42 is connected to the connecting orifice 43. As is shown in FIG. 6-1, with this structure arrangement, the axis of the first connecting pipe 41 is configured to be coplanar with that of the second connecting pipe 42, and the two axes form an angle of 90 degree. Therefore it can be applied to the application environments of the refrigerating system.

Figures 1, 7:
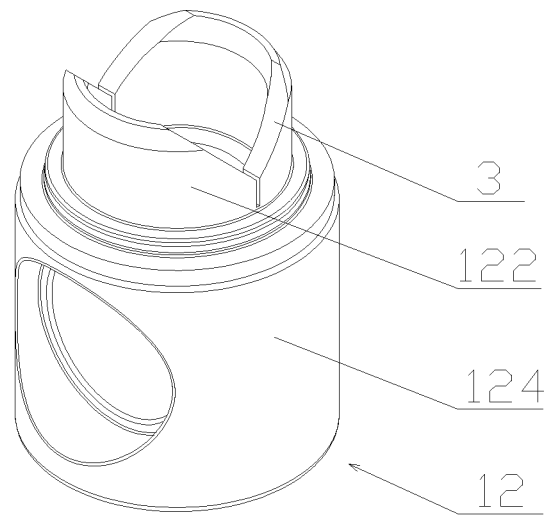
Figures 2, 7:
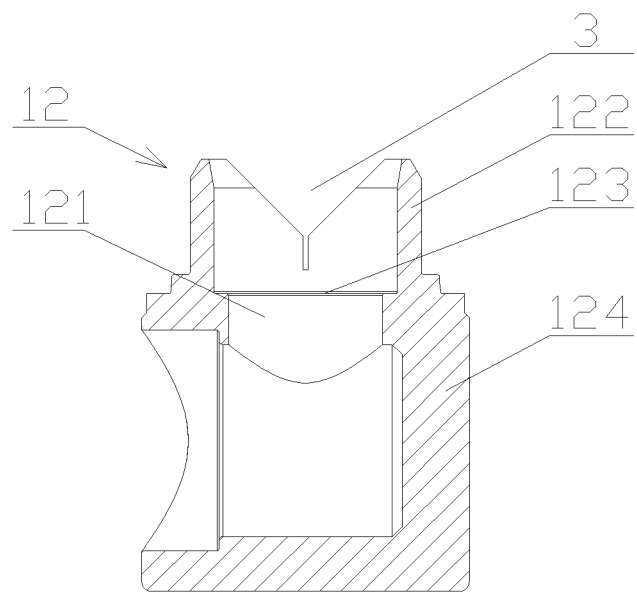
Figures 1, 8:
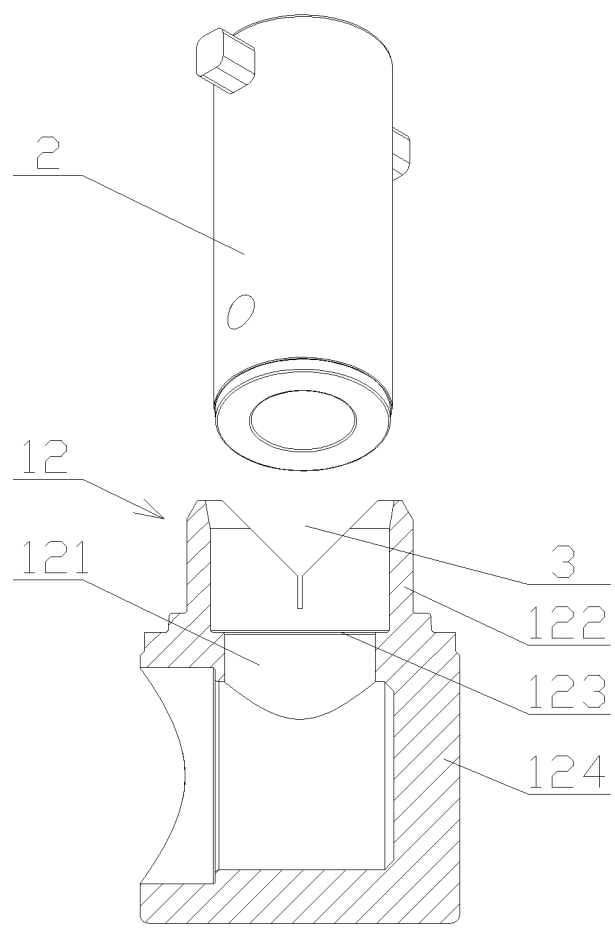
Figures 2, 8:
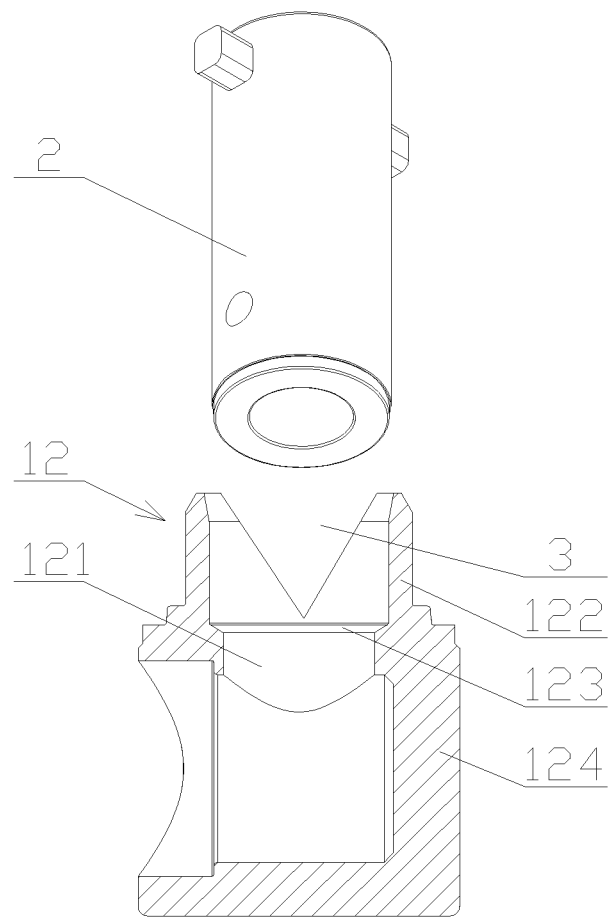
Figures 3, 8:
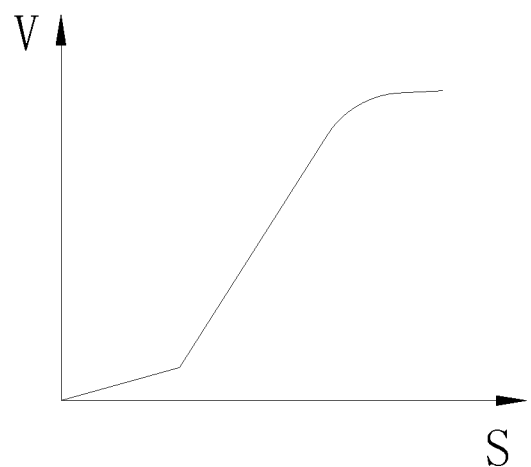
Figures 4, 8:
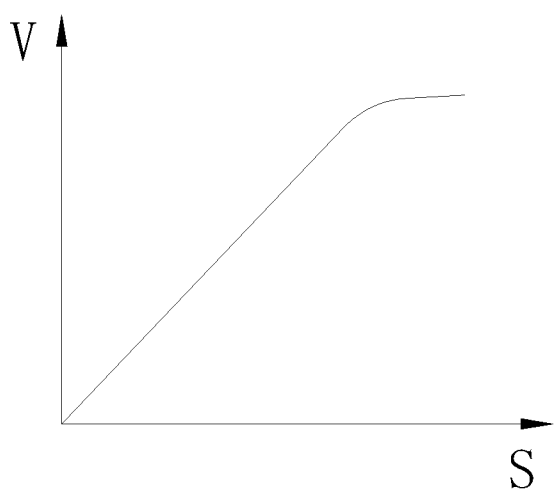

On basis of any one of the above technical solutions, the position of the opening groove 3 and the corresponding structure may be further configured. Referring to FIG. 7-1, FIG. 7-2, FIG. 8-1 and FIG. 8-2. FIG. 7-1 is a structural schematic view of the lower valve seat in FIG. 5-1; FIG. 7-2 is a sectional view of the lower valve seat in FIG. 7-1; FIG. 8-1 is an assembly schematic view of a valve rod and the lower valve seat shown in FIG. 7-1 and FIG. 7-2; and FIG. 8-2 is a structural schematic view of a lower valve seat and a valve rod improved on those of FIG. 8-1.

As is shown in FIG. 7-1, the opening groove 3 is provided on the circumferential side wall of the sleeve protrusion portion 122. On this basis, as is shown in FIG. 7-2, the sleeve protrusion portion 122 is provided with a first sealing stepped surface 123 at a position lower than the lowest end of the opening groove 3. The first sealing stepped surface 123 may be provided inside of the sleeve protrusion portion 122. On this basis, as is shown in FIG. 8-1, the lower end portion of the valve rod 2 is projected into the interior of the sleeve protrusion portion 122 or is moved out of the sleeve protrusion portion such that the lower end face of the valve rod 2 is hermetically contacted with the first sealing stepped surface 123 or is disengaged from the first sealing stepped surface 123. In this structural arrangement, the lower end face of the valve rod 2 is sealed with the first sealing stepped surface 123, and the lower end face of the valve rod 2 is less prone to be deformed because of its strong rigidity. Therefore, compared with the structural arrangement of the sealing member in the prior art, the sealing performance and service life of the present application are significantly improved.

Apparently, the first sealing stepped surface 123 may be provided outside of the sleeve protrusion portion 122. On this basis, the lower end portion of the valve rod 2 is required to be sleeved outside of the sleeve protrusion portion 122. The technical effect of this kind of structural design is substantially the same with that mentioned above, which will not be described in detail herein.

Also, referring to FIG. 8-1, FIG. 8-2, FIG. 8-3 and FIG. 8-4, FIG. 8-3 is a flow curve schematic view formed by a cooperation structure of the lower valve seat and the valve rod shown in FIG. 8-1; and FIG. 8-4 is a flow curve schematic view formed by a cooperation structure of the lower valve seat and the valve rod shown in FIG. 8-2.

It should be noted that, the shape of the opening groove 3 is not limited in the present application, thus an opening groove 3 having any shape falls within the protection scope of the present application. As is shown in FIG. 8-2, the opening groove 3 may have a V shape, and the larger opening end of the V-shaped groove is faced towards the sleeve protrusion portion 122. The flow curve of the V-shaped groove is as shown in FIG. 8-4. The larger the angle of the V-shaped groove is, the larger the corresponding curvature of the flow curve is, and thus the larger the flow regulation scope is. As is shown in FIG. 8-1, the opening groove 3 has a Y shape, and the larger opening end of the Y-shaped groove is faced towards the sleeve protrusion portion 122. The flow curve of the Y-shaped groove is shown in FIG. 8-3. The flow curve of the Y-shaped groove is in a fold line with respect to that of the V-shaped groove in FIG. 8-4.

Figures 1, 9:
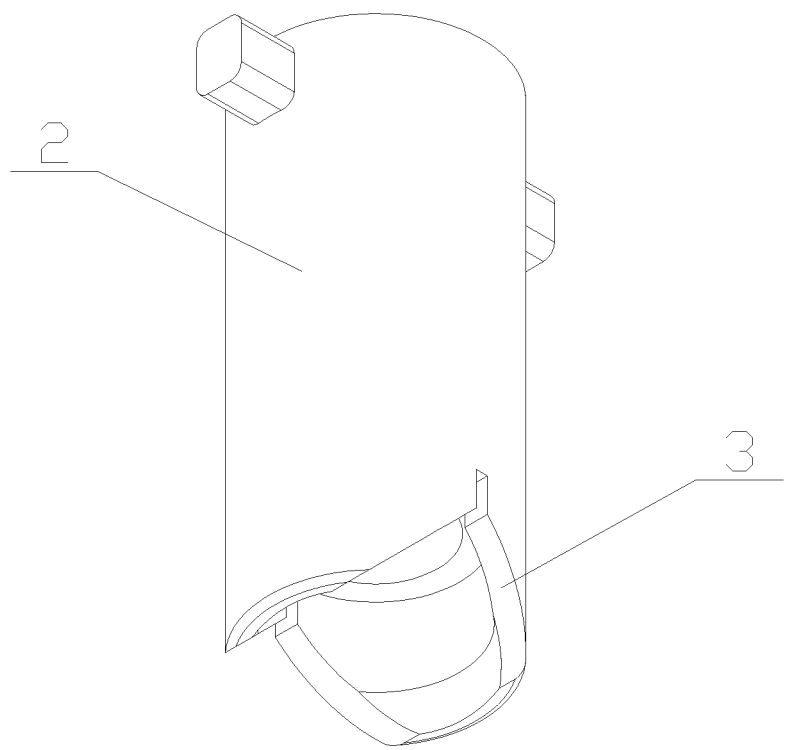
Figures 2, 9:
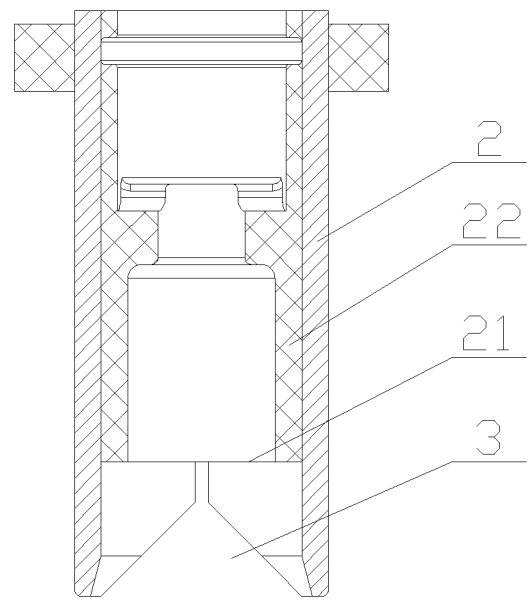
Figures 3, 9:
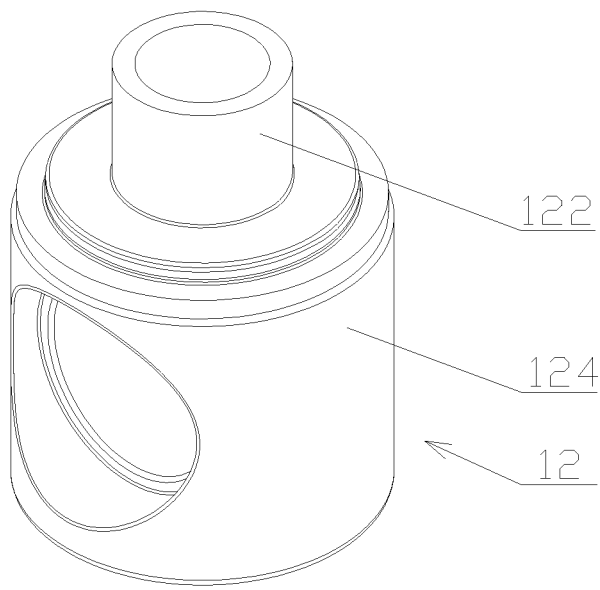

As is shown in FIG. 9-1, FIG. 9-2 and FIG. 9-3, FIG. 9-1 is a structural schematic view of a valve rod of a flow adjusting valve according to another embodiment of the present application; FIG. 9-2 is a sectional view of the valve rod in FIG. 9-1; and FIG. 9-3 is a structural schematic view of a lower valve seat cooperated with the valve rod in FIG. 9-1.

Apparently, the opening groove 3 may be provided on the lower end portion of the valve rod 2. As is shown in FIG. 9-1, the circumferential side wall of the lower end portion of the valve rod 2 is provided with the opening groove 3. On this basis, as is shown in FIG. 9-2, the lower end portion of the valve rod 2 is provided with a second sealing stepped surface 21 at a position higher than the uppermost end of the opening groove 3. And further, the second sealing stepped surface 21 may be provided inside of the lower end portion of the valve rod 2. On this basis, also referring to FIG. 9-1 to FIG. 9-3, the sleeve protrusion portion 122 may be projected into the lower end portion of the valve rod 2 or be moved therefrom, such that the upper end face of the sleeve protrusion portion 122 is hermetically contacted with the second sealing stepped surface 21 or is disengaged from the second sealing stepped surface 21. In this structural design, the upper end face of the sleeve protrusion portion 122 is sealed with the second sealing stepped surface 21, and the second sealing stepped surface 21 is less prone to be deformed because of its strong rigidity. Therefore, compared with the structural arrangement of the sealing member in the prior art, the sealing performance and service life of the present application are significantly improved.

Apparently, the second sealing stepped surface 21 may be provided outside of the lower end portion of the valve rod 2. On this basis, the sleeve protrusion portion 122 is sleeved on the lower end portion of the valve rod 2, such that the upper end face of the sleeve protrusion portion 122 is hermetically contacted with the second sealing stepped surface 21 or is disengaged from the second sealing stepped surface. The technical effect of this structural design is substantially the same with the above, which will not be described in detail herein.

As is shown in FIG. 9-2, further improvements may be made to the above technical solutions. For example, an injection molded body 22 for installing a nut is provided inside of the valve rod 2, and the lower end face of the injection molded body 22 is higher than the uppermost end of the opening groove 3. The lower end face of the injection molded body 22 is formed with the second sealing stepped surface 21. The structural design on one hand is convenient for the installing of the nut, and on the other hand, is convenient for the forming of the second sealing stepped surface 21. Therefore, the structure has a good integration effect.

Figures 1, 10:
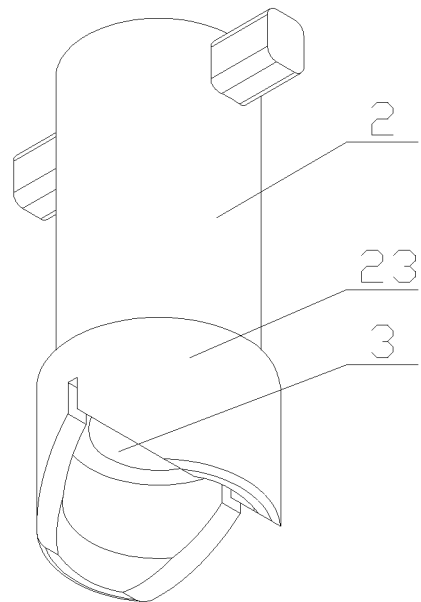
Figures 2, 10:
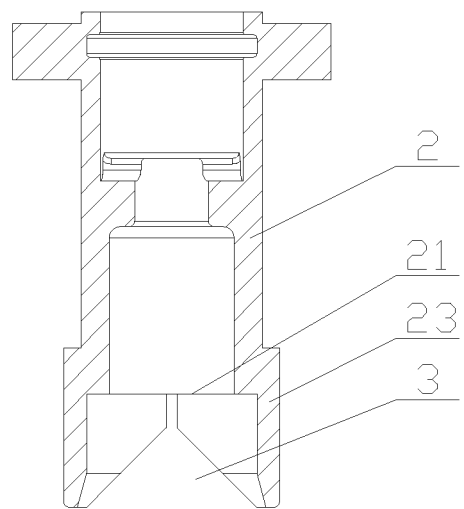

Referring to FIG. 10-1 and FIG. 10-2, FIG. 10-1 is a structural schematic view of a valve rod improved on that in FIG. 9-1; and FIG. 10-2 is a sectional view of the valve rod in FIG. 10-1.

In addition, the second sealing stepped surface 21 may have another structure. As is shown in FIG. 10-1 and FIG. 10-2, the lower end portion of the valve rod 2 is integrated with a circumferential expanded portion 23 having an increased external diameter, and the second sealing stepped surface 21 is provided inside of the circumferential expanded portion 23. This structural design also can be formed with the second sealing stepped surface 21 more conveniently and has a low cost.

Figure 11:
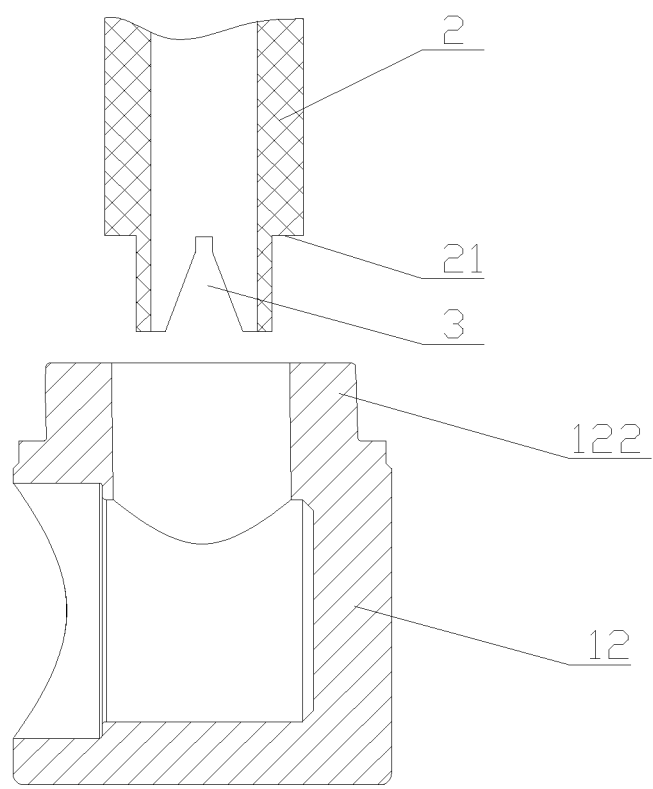
FIG. 11 is schematic view showing a cooperation structure of a valve rod and a lower valve seat according to another embodiment of the present application.

Furthermore, the second sealing stepped surface 21 may also be provided outside of the lower end portion of the valve rod 2. Referring to FIG. 11, FIG. 11 is a schematic view showing a cooperation structure of a valve rod and a lower valve seat according to another embodiment of the present application.

As is shown in FIG. 11, the lower end portion of the valve rod 2 is provided with an opening groove 3, and the second sealing stepped surface 21 is provided outside of the lower end portion of the valve rod 2, the lower end portion of the valve rod 2 is projected into the sleeve protrusion portion 122 or is moved out of the sleeve protrusion portion such that the second sealing stepped surface 21 is hermetically contacted with the upper end face of the sleeve protrusion portion 122 or is disengaged from the upper end face of the sleeve protrusion portion 122. Apparently, the technical solution can also solve the technical problem and achieve the object of the present application. And this structural design can also be formed with the second sealing stepped surface 21 more conveniently and has a low cost.

Finally, it should be noted that, in any of the above technical solutions, the valve rod 2 may have an integral structure in the axial direction since the present application avoids employing the structural design of the sealing sheet in the prior art. Therefore, the valve rod 2 will not be disconnected due to the bump and vibration in transportation or the vibration of the compressor in operation.

The flow adjusting valve according to the present application is described in detail through the above description. Specific examples are employed to describe the principle and embodiments of the present application. The description of the above embodiments is only provided for the understanding of the method of the present application and the core idea thereof. It should be noted that, those skilled in the art may make many modifications and improvements to the present application without departing from the principle of the present application, and all these modifications and improvements should fall within the protection scope of the claims of the present application.

The invention claimed is:

1. A flow adjusting valve comprising a valve seat and a valve rod, the valve seat being provided, in a valve cavity thereof, with a valve port, and the valve port being opened or closed by the valve rod; wherein the valve port is provided with a sleeve protrusion portion projected upwards along an axial direction of the valve port, the valve rod has a tubular shape and a conduit extends through the valve rod in the axial direction, and a lower end portion of the valve rod is a cylinder; a circumferential side wall of one of the sleeve protrusion portion and a lower end portion of the valve rod is provided with an opening groove configured to adjust a flow amount, and one of the sleeve protrusion portion and the lower end portion of valve rod is projected into or moved out of the other one so as to stop the communication between the opening groove and the valve port or to communicate the opening groove with the valve port.

2. The flow adjusting valve according to claim 1, wherein the opening groove is provided on the circumferential side wall of the sleeve protrusion portion; and the sleeve protrusion portion is provided with a first sealing stepped surface at a position lower than the lowest end of the opening groove, and a lower end face of the valve rod is hermetically contacted with or disengaged from the first sealing stepped surface.

3. The flow adjusting valve according to claim 2, wherein the valve seat has a split structure comprising an upper valve seat and a lower valve seat, the valve port and the sleeve protrusion portion are provided on the lower valve seat, and the sleeve protrusion portion is projected into a cavity of the upper valve seat.

4. The flow adjusting valve according to claim 2, wherein the first sealing stepped surface is provided inside of the sleeve protrusion portion, and the lower end portion of the valve rod is projected into or moved out of the sleeve protrusion portion.

5. The flow adjusting valve according to claim 4, wherein the valve seat has a split structure comprising an upper valve seat and a lower valve seat, the valve port and the sleeve protrusion portion are provided on the lower valve seat, and the sleeve protrusion portion is projected into a cavity of the upper valve seat.

6. The flow adjusting valve according to claim 1, wherein the opening groove is provided on the circumferential side wall of the lower end portion of the valve rod; and the lower end portion of the valve rod is provided with a second sealing stepped surface at a position higher than the uppermost end of the opening groove, and an upper end face of the sleeve protrusion portion is hermetically contacted with or is disengaged from the second sealing stepped surface.

7. The flow adjusting valve according to claim 6, wherein the second sealing stepped surface is provided outside of the lower end portion of the valve rod, and the lower end portion of the valve rod is projected into or moved out of the sleeve protrusion portion.

8. The flow adjusting valve according to claim 6, wherein the valve seat has a split structure comprising an upper valve seat and a lower valve seat, the valve port and the sleeve protrusion portion are provided on the lower valve seat, and the sleeve protrusion portion is projected into a cavity of the upper valve seat.

9. The flow adjusting valve according to claim 6, wherein the second sealing stepped surface is provided within the lower end portion of the valve rod, and the sleeve protrusion portion is projected into or moved out of the lower end portion of the valve rod.

10. The flow adjusting valve according to claim 9, wherein the valve seat has a split structure comprising an upper valve seat and a lower valve seat, the valve port and the sleeve protrusion portion are provided on the lower valve seat, and the sleeve protrusion portion is projected into a cavity of the upper valve seat.

11. The flow adjusting valve according to claim 9, wherein the lower end portion of the valve rod is integrally formed with a circumferential expanded portion having an increased external diameter, and the second sealing stepped surface is provided inside of the circumferential expanded portion.

12. The flow adjusting valve according to claim 11, wherein the valve seat has a split structure comprising an upper valve seat and a lower valve seat, the valve port and the sleeve protrusion portion are provided on the lower valve seat, and the sleeve protrusion portion is projected into a cavity of the upper valve seat.

13. The flow adjusting valve according to claim 9, wherein an injection molded body for installing a nut is provided inside of the valve rod, a lower end face of the injection molded body is higher than the uppermost end of the opening groove, and the lower end face of the injection molded body is formed with the second sealing stepped surface.

14. The flow adjusting valve according to claim 4, wherein the valve seat has a split structure comprising an upper valve seat and a lower valve seat, the valve port and the sleeve protrusion portion are provided on the lower valve seat, and the sleeve protrusion portion is projected into a cavity of the upper valve seat.

15. The flow adjusting valve according to claim 1, wherein the opening groove is a V-shaped groove, and the larger opening end of the V-shaped groove is faced towards the sleeve protrusion portion or the lower end portion of the valve rod.

16. The flow adjusting valve according to claim 1, wherein the opening groove is a Y-shaped groove, and the larger opening end of the Y-shaped groove is faced towards the sleeve protrusion portion or the lower end portion of the valve rod.

17. The flow adjusting valve according to claim 1, wherein the valve seat has a split structure comprising an upper valve seat and a lower valve seat, the valve port and the sleeve protrusion portion are provided on the lower valve seat, and the sleeve protrusion portion is projected into a cavity of the upper valve seat.

18. The flow adjusting valve according to claim 17, further comprising a first connecting pipe and a second connecting pipe, wherein the first connecting pipe is connected to the upper valve seat, and the second connecting pipe is connected to the lower valve seat.

19. The flow adjusting valve according to claim 18, wherein the lower valve seat comprises a base, the sleeve protrusion portion is provided on an upper end of the base, a circumferential side wall of the base is provided with a connecting orifice, and the second connecting pipe is connected to the connecting orifice.

20. The flow adjusting valve according to claim 18, wherein the lower valve seat comprises a base, and the sleeve protrusion portion is provided on an upper end of the base; and the base is in a sleeve shape, a lower end face of the base is provided with a connecting orifice, and the second connecting pipe is connected to the connecting orifice.

* * * * *